(12) United States Patent
Nakano

(10) Patent No.: US 11,294,214 B2
(45) Date of Patent: Apr. 5, 2022

(54) DISPLAY DEVICE

(71) Applicant: Japan Display Inc., Tokyo (JP)

(72) Inventor: Yasushi Nakano, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/146,494

(22) Filed: Jan. 12, 2021

(65) Prior Publication Data

US 2021/0223603 A1 Jul. 22, 2021

(30) Foreign Application Priority Data

Jan. 17, 2020 (JP) .............................. JP2020-006232

(51) Int. Cl.
*G02F 1/1333* (2006.01)
*G02F 1/1335* (2006.01)
*G02F 1/1343* (2006.01)

(52) U.S. Cl.
CPC .... *G02F 1/133308* (2013.01); *G02F 1/13356* (2021.01); *G02F 1/133331* (2021.01); *G02F 1/133334* (2021.01); *G02F 1/133528* (2013.01); *G02F 1/134309* (2013.01)

(58) Field of Classification Search
CPC ..................... G02F 1/133334; G02F 1/133331
See application file for complete search history.

(56) References Cited

U.S. PATENT DOCUMENTS

2010/0123864 A1* 5/2010 Sugiyama ............. G02F 1/1345 349/138
2018/0203553 A1* 7/2018 Li ......................... G06F 3/0412

FOREIGN PATENT DOCUMENTS

| CN | 109061928 A | * 12/2018 | |
| CN | 109426044 A | * 3/2019 | .............. G02B 1/16 |
| JP | 2018-66796 A | 4/2018 | |

* cited by examiner

*Primary Examiner* — Jessica M Merlin
(74) *Attorney, Agent, or Firm* — Xsensus LLP

(57) ABSTRACT

According to one embodiment, a display device includes a first substrate including an electrode, a second substrate overlaid on the first substrate, an optical sheet overlaid on the second substrate, a conductive member located between the second substrate and the optical sheet, and a connecting member making electric connection between the conductive member and the electrode. The first substrate includes a first region overlaid on the second substrate, and a second region extending more than the second substrate and including the electrode. The second substrate includes a substrate end portion located on a boundary between the first region and the second region and extending along a first direction. The connecting member is in contact with the electrode and the conductive member.

10 Claims, 14 Drawing Sheets

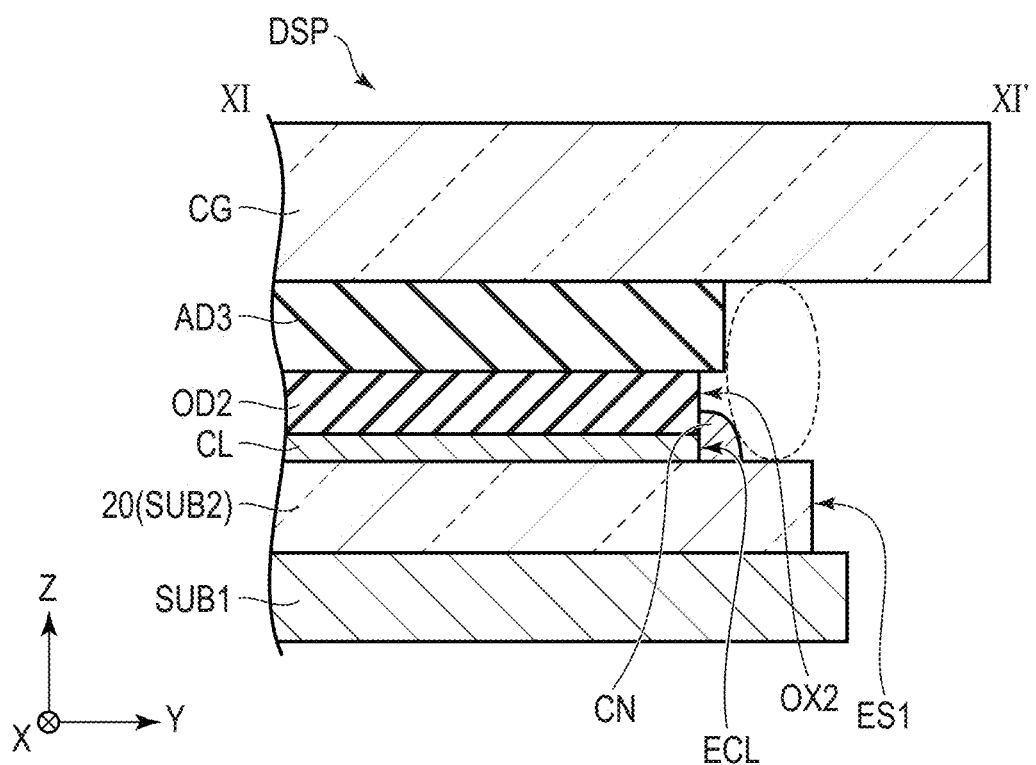
F I G. 11

DISPLAY DEVICE

CROSS-REFERENCE TO RELATED APPLICATION

This application is based upon and claims the benefit of priority from Japanese Patent Application No. 2020-006232, filed Jan. 17, 2020, the entire contents of which are incorporated herein by reference.

FIELD

Embodiments described herein relate generally to a display device.

BACKGROUND

Techniques of electrically connecting a transparent conductive coating provided on a surface of one of substrates to electrodes of a ground potential and circuit boards provided on the other substrate by connecting members, for measurement against static electricity, in liquid crystal display devices of the lateral electric field system, are known. In general, a polarizer is provided on a transparent conductive coating. Recently, a polarizer and connecting members tend to be arranged closely to each other in response to a demand to narrow a frame in the liquid crystal display devices. As a result, there is a risk that an area where the connecting members and the transparent conductive coating are in contact with each other is reduced, which may cause an electric connection error between the connecting members and the transparent conductive coating.

BRIEF DESCRIPTION OF THE DRAWINGS

FIG. 11 is a cross-sectional view taken along line XI-XI' shown in FIG. 10.

DETAILED DESCRIPTION

Figure 1:
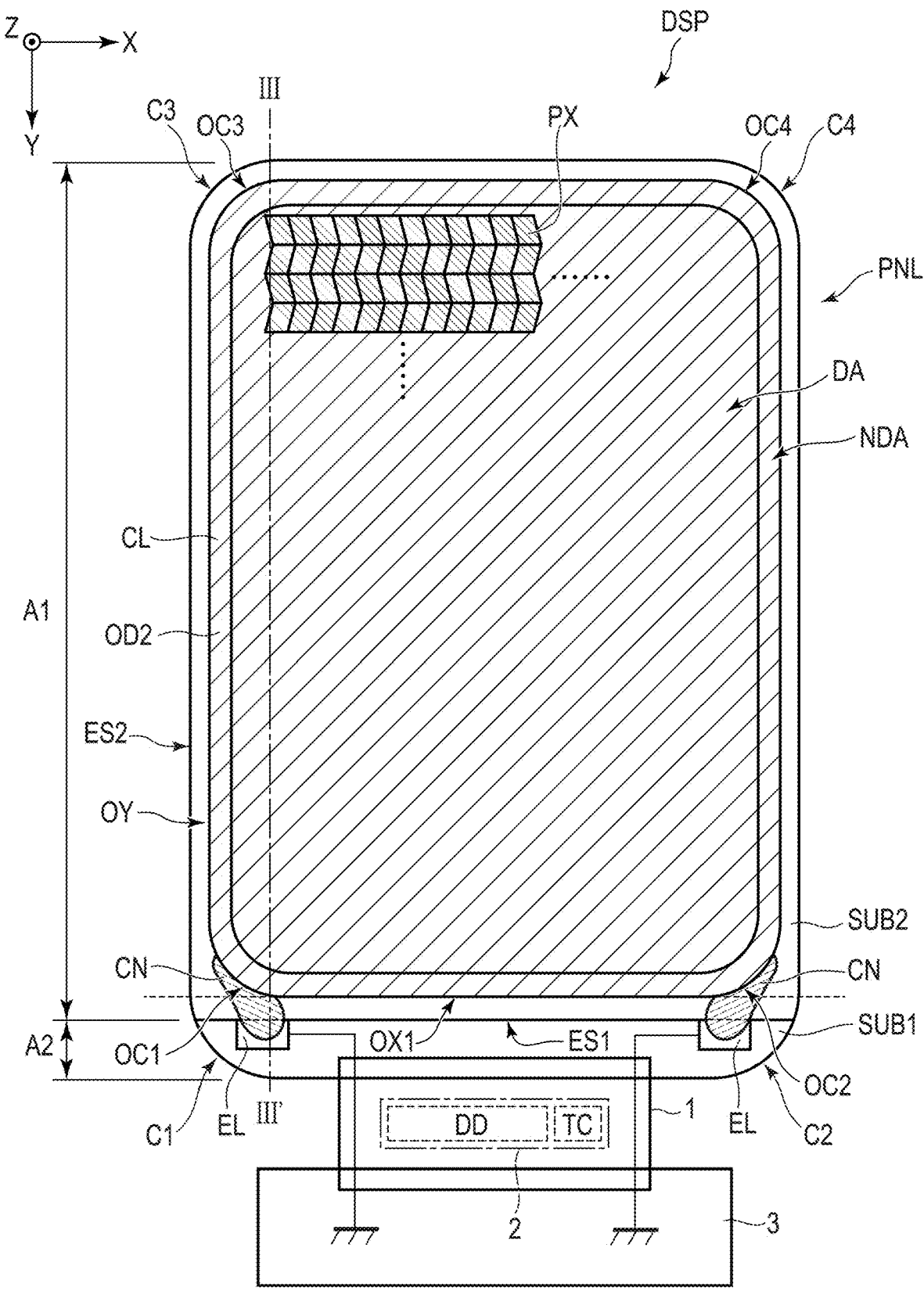
FIG. 1 is a plan view showing an example of an appearance of a display device according to a first embodiment.

In general, according to one embodiment, a display device comprises a first substrate comprising an electrode, a second substrate overlaid on the first substrate, an optical sheet overlaid on the second substrate, a conductive member located between the second substrate and the optical sheet, and a connecting member making electric connection between the conductive member and the electrode. The first substrate includes a first region overlaid on the second substrate and a second region extending more than the second substrate and including the electrode. The second substrate includes a substrate end portion located on a boundary between the first region and the second region and extending along a first direction. The optical sheet has a first end portion parallel to the substrate end portion. The connecting member is in contact with the electrode and is also in contact with the conductive member. A first distance between the substrate end portion and a position where the connecting member is in contact with the conductive member is larger than a second distance between the first end portion and the substrate end portion, in a second direction intersecting the first direction.

According to this structure, the display device capable of suppressing reduction of the reliability can be provided.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First Embodiment

FIG. 1 is a plan view showing an example of an appearance of a display device DSP according to a first embodiment. The first direction X, the second direction Y, and the third direction Z shown in the figure are orthogonal to each other but may intersect at an angle other than 90 degrees. The first direction X and the second direction Y correspond to the directions parallel to the main surface of a substrate constituting the display device DSP, and the third direction Z corresponds to the thickness direction of the display device DSP. For example, the first direction X corresponds to the direction of shorter sides of the display device DSP, and the second direction Y corresponds to the direction of longer sides of the display device DSP. In the present specification, an observation position at which the display device DSP is to be observed is assumed to be set at the pointing end side of the arrow indicating the third direction Z, and a view toward an X-Y plane defined by the first direction X and the second direction Y from this observation position is called a planar view.

The display device DSP of the embodiment comprises, for example, a display function of displaying an image and a touch detection function of detecting contact or touch of an object on the display device DSP. The display device DSP comprises a display panel PNL, a flexible printed circuit 1, an IC chip 2, a circuit board 3, and connecting members CN.

The display panel PNL is, for example, an active-matrix liquid crystal display panel. The display panel PNL is formed in a substantially rectangular shape extending in the second direction Y and four corner portions C1, C2, C3, and C4 are formed in a curved shape. For example, the corner portions C1, C2, C3, and C4 are formed in an arcuate shape.

The display panel PNL comprises a first substrate SUB1, a second substrate SUB2, an optical sheet OD2, a conductive member CL, and the like. The first substrate SUB1 comprises a first region A1 and a second region A2 arranged in the second direction Y. The second substrate SUB2 is overlaid on the first substrate SUB1 in the first region A1, but is not overlaid on the second region A2.

The first substrate SUB1 comprises electrodes EL in the second region A2. The electrodes EL are grounded via, for example, the flexible printed circuit 1 but may be set to a predetermined fixed potential.

In the example illustrated, two electrodes EL are provided near the corner portions C1 and C2, respectively. Incidentally, the electrodes EL may be provided at only one position or may be provided at three or more positions.

The second substrate SUB2 includes a substrate end portion ES1 located on the boundary between the first region A1 and the second region A2. The substrate end portion ES1 extends straight along the first direction X. In addition, the second substrate SUB2 includes a substrate end portion ES2 extending along the second direction Y. In the example illustrated, the substrate end portion ES2 is overlaid on the end portion of the first substrate SUB1 along the second direction Y.

In addition, the liquid crystal panel PNL includes a display region DA on which an image is displayed and a non-display region NDA shaped in a frame surrounding the display region DA. The display region DA includes a plurality of pixels PX arrayed in a matrix in the first direction X and the second direction Y. The pixel PX is indicative of a minimum unit that can be controlled individually in response to the pixel signal. The pixel PX is, for example, a red pixel displaying a red color, a green pixel displaying a green color, a blue pixel displaying a blue color, or a white pixel displaying a white color. The display region DA is included in the first region A1. The second region A2 is included in the non-display region NDA.

The optical sheet OD2 is entirely overlaid on the second substrate SUB2. The optical sheet OD2 is overlaid on the entire display region DA and extends to the non-display region NDA. The optical sheet OD2 is formed in a substantially rectangular shape elongated in the second direction Y and four end portions OC1, OC2, OC3, and OC4 located at corners are formed in a curved shape, similarly to the display panel PNL. For example, the end portions OC1, OC2, OC3, and OC4 are formed in an arcuate shape. In addition, the optical sheet OD2 comprises an end portion (first end portion) OX1 extending parallel to the substrate end portion ES1 and an end portion OY extending along the substrate end portion ES2. In the example illustrated, the end portion (second end portion) OC1 connects the end portions OX1 and OY. All the end portions OX1, OY, OC1, OC2, OC3, and OC4 are included in the first region A1.

The conductive member CL is provided to be overlaid on the optical sheet OD2 as represented by hatch lines in the figure. That is, the region where the conductive member CL is provided is substantially coincident with the region where the optical sheet 002 is provided, in planar view. In the embodiment, the conductive member CL is a conductive adhesive, which bonds the optical sheet 002 to the display panel PNL.

The connecting members CN are located in the non-display region NOA to make electric connection between the electrodes EL and the conductive member CL. That is, the connecting members CN extend from the second region A2 to the first region A1 through the substrate end portion ES1. In the embodiment, the connecting members CN extend to the side more separated from the substrate end portion ES1 than from the end portion OX1, in the first region A1. In the example illustrated, the connecting member CN connected to the electrode EL on the corner portion C1 side is in contact with the end portion OC1, and the connecting member CN connected to the electrode EL on the corner portion C2 side is in contact with the end portion OC2.

The flexible printed circuit 1 is mounted in the second region A2 and is electrically connected to the circuit board 3. The IC chip 2 is mounted on the flexible printed circuit 1. The IC chip 2 incorporates a display driver DD and a touch controller TC. The display driver DD outputs various signals necessary for image display, in an image display mode of displaying images in the display region DA. The touch controller TC controls a touch sensing mode of detecting approach of an object to the display device DSP or contact of an object on the display device DSP. Incidentally, the IC chip 2 may be mounted in the second region A2.

Figure 2:
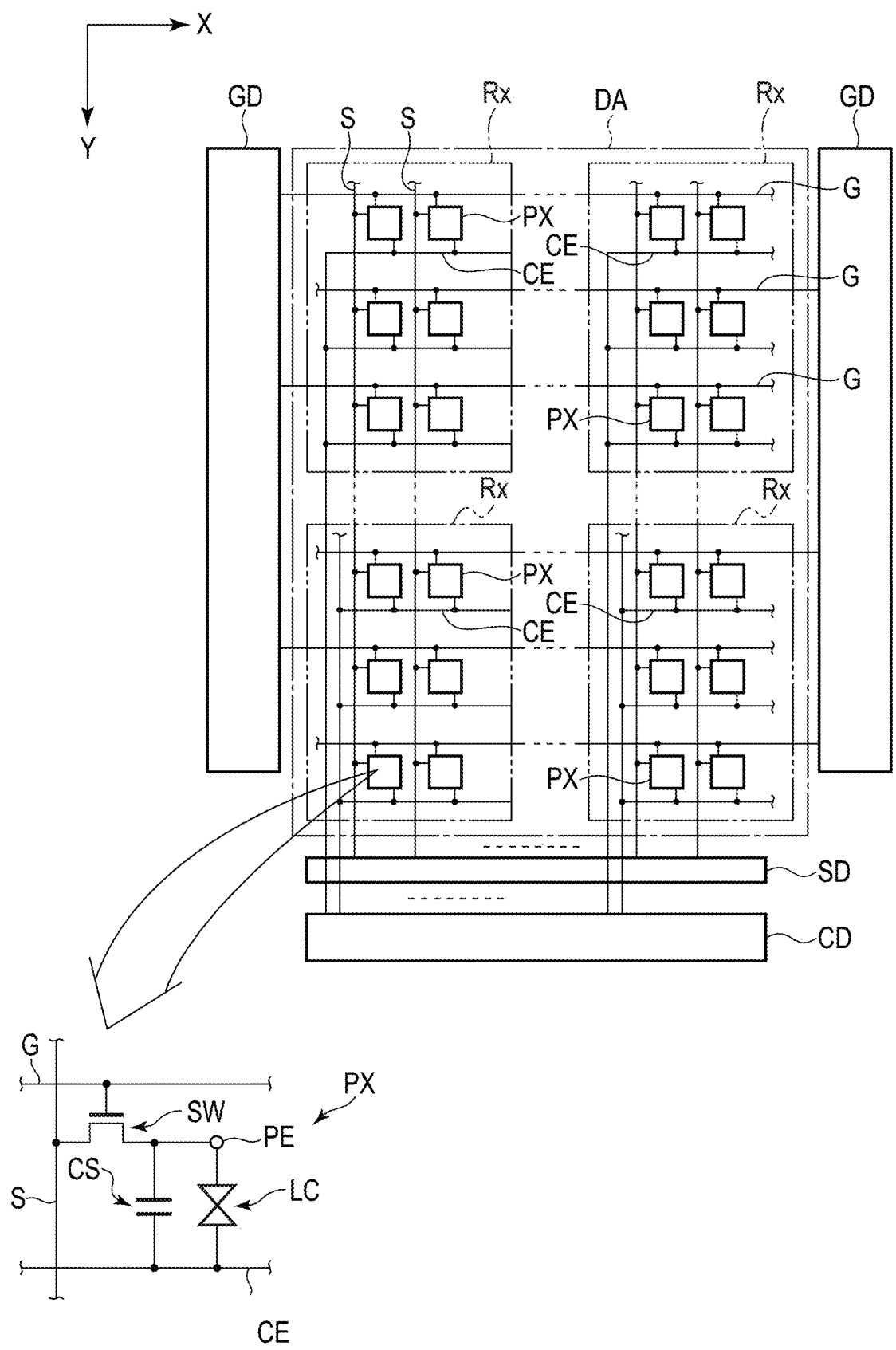
FIG. 2 is a view showing a basic configuration of a pixel and an equivalent circuit.

FIG. 2 is a view showing a basic configuration of the pixel PX and an equivalent circuit. A plurality of scanning lines G extend in the first direction X to be electrically connected to a scanning line drive circuit GD. A plurality of signal lines S extend in the second direction Y to be electrically connected to a signal line drive circuit SD. Incidentally, the scanning lines G and the signal lines S do not necessarily extend straight but may be partially curved or bent. For example, the signal lines S are assumed to extend in the second direction Y even if the signal lines S are partially curved or bent.

The common electrode CE is arranged across a plurality of pixels PX. The common electrode CE is electrically connected to a voltage supply unit CD and the touch controller TC shown in FIG. 1. In the image display mode, the voltage supply unit CD supplies a common voltage (Vcom) to the common electrode CE. In the touch sensing mode, the touch controller TC supplies a touch drive voltage different from the common voltage to the common electrode CE and reads a touch signal from the common electrode CE. Such common electrodes CE are arrayed in a matrix in the first direction X and the second direction Y in the display region DA and each of the common electrodes CE functions as a detection electrode Rx.

Each pixel PX comprises a switching element SW, a pixel electrode PE, a common electrode CE, a liquid crystal layer LC and the like. The switching element SW is constituted by, for example, a thin-film transistor (TFT) and is electrically connected to the scanning line G and the signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. Each of the pixel electrodes PE is opposed to the common electrode CE, and drives the liquid crystal layer LC by an electric field produced between the pixel electrode PE and the common electrode CE. A capacitance CS is formed, for example, between the common electrode CE and an electrode of the same potential, and between the pixel electrode PE and an electrode of the same potential.

Figure 3:
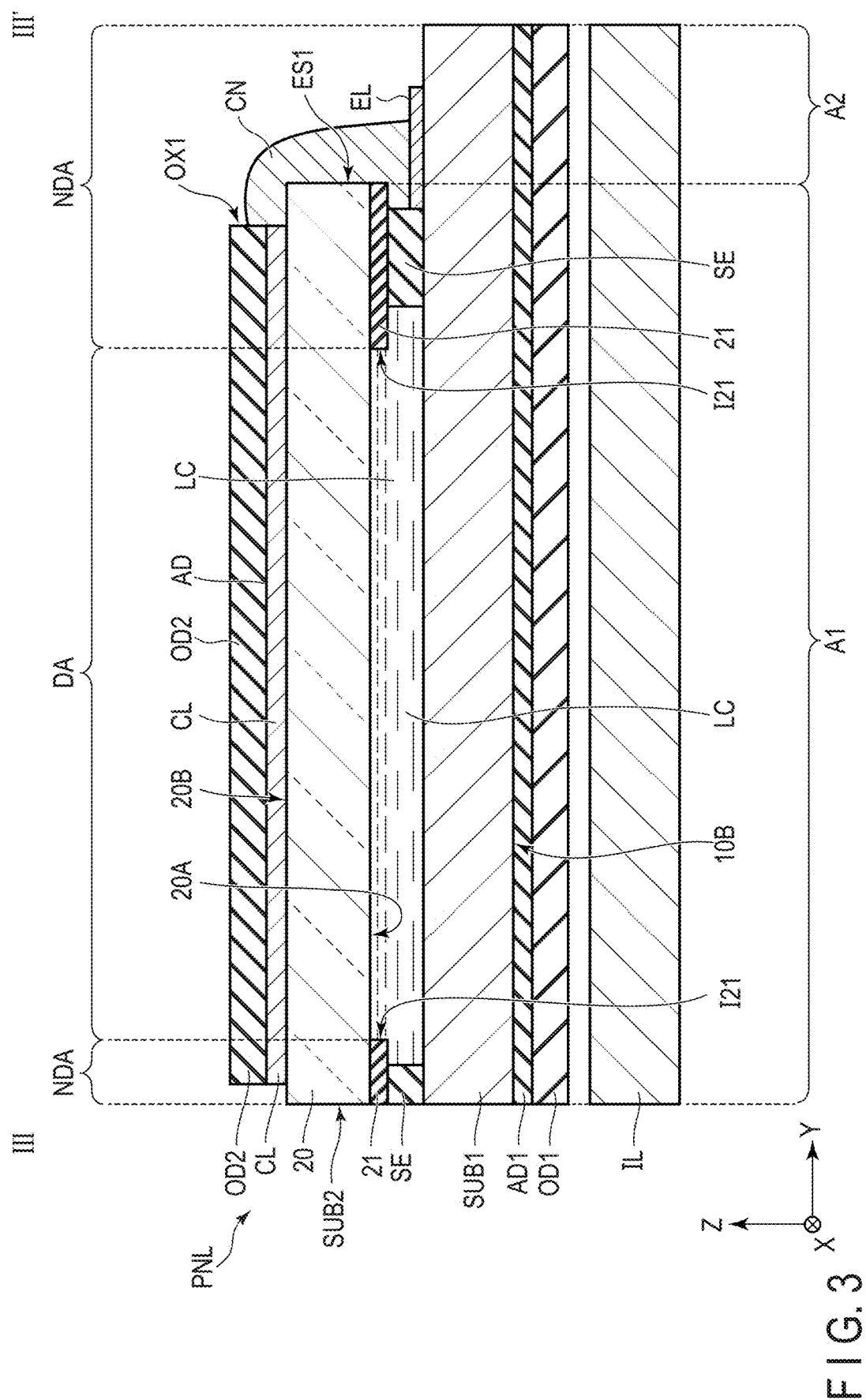
FIG. 3 is a cross-sectional view showing the display device taken along line III-III' shown in FIG. 1.

FIG. 3 is a cross-sectional view showing the display device DSP taken along line shown in FIG. 1. Incidentally, constituent elements necessary for explanations will be shown and the first substrate SUB1 and the second substrate SUB2 are simplified. In the present specification, a direction from the first substrate SUB1 to the second substrate SUB2 may be referred to as an upper side (or, more simply, upwardly) and a direction from the second substrate SUB2 to the first substrate SUB1 may be referred to as a lower side direction (or, more simply, downwardly). According to "a second member above a first member" and "a second member below a first member", the second member may be in contact with the first member or may be separated from the first member. In the example illustrated, an illumination device IL is arranged under the display panel PNL. The illumination device IL applies illumination light toward the display panel PNL.

The display panel PNL comprises the liquid crystal layer LC, the sealant SE, the optical sheet OD1, and the like in addition to the first substrate SUB1, the second substrate SUB2, the optical sheet OD2, and the conductive member CL. The first substrate SUB1 is formed of a transparent insulating substrate such as a glass substrate or a flexible resin substrate. The switching elements SW, the signal lines, the scanning lines, and various insulating film shown in FIG. 2, and the like, are formed on the first substrate SUB1. The second substrate SUB2 is formed of a transparent insulating substrate 20 such as a glass substrate or a flexible resin substrate. A color filter layer including, for example, red, green and blue color filters, and the like are formed on the second substrate SUB2. Furthermore, the second substrate SUB2 comprises a light-shielding layer 21. The light-shielding layer 21 is provided on an inner surface 20A of the insulating substrate 20 and is located in the non-display region NDA. The inner surface 20A is a surface of the insulating substrate 20, which faces the first substrate SUB1. The light-shielding layer 21 is arranged to surround the display region DA. A boundary between the display region DA and the non-display region NDA is defined by an inner peripheral part I21 of the light-shielding layer 21.

The liquid crystal layer LC is located between the first substrate SUB1 and the second substrate SUB2. The sealant SE is located in the non-display region NDA to bond the first substrate SUB1 and the second substrate SUB2 and to seal the liquid crystal layer LC. The sealant SE is provided at a position overlaid on the light-shielding layer 21.

The optical sheet OD1 includes a polarizer. The optical sheet OD1 is provided on an outer surface 10B side of the first substrate SUB1. The outer surface 10B is a surface of the first substrate SUB1 on aside opposite to the surface facing the second substrate SUB2. The optical sheet OD1 is bonded to the outer surface 10B by an adhesive layer AD1. For example, the adhesive layer AD1 is not conductive.

The optical sheet OD2 includes a polarizer. The optical sheet OD2 is provided on a side of an outer surface (i.e., a surface on a side opposite to the inner surface 20A) 20B of the insulating substrate 20. The optical sheet OD2 is bonded to the outer surface 20B by the conductive member CL. In other words, the conductive member CL is located between the optical sheet OD2 and the insulating substrate 20.

Incidentally, the optical sheets OD1 and OD2 may comprise a retardation film, a scattering layer, an antireflective layer, and the like as needed.

The connecting member CN is continuously provided between the electrode EL and the conductive member CL. The conductive member CL and the electrode EL are thereby electrically connected. In the example illustrated, the connecting member CN is in contact with the electrode EL and the conductive member CL and is also in contact with the sealant SE, the light-shielding layer 21, the insulating substrate 20, and the optical sheet OD2.

Figure 4:
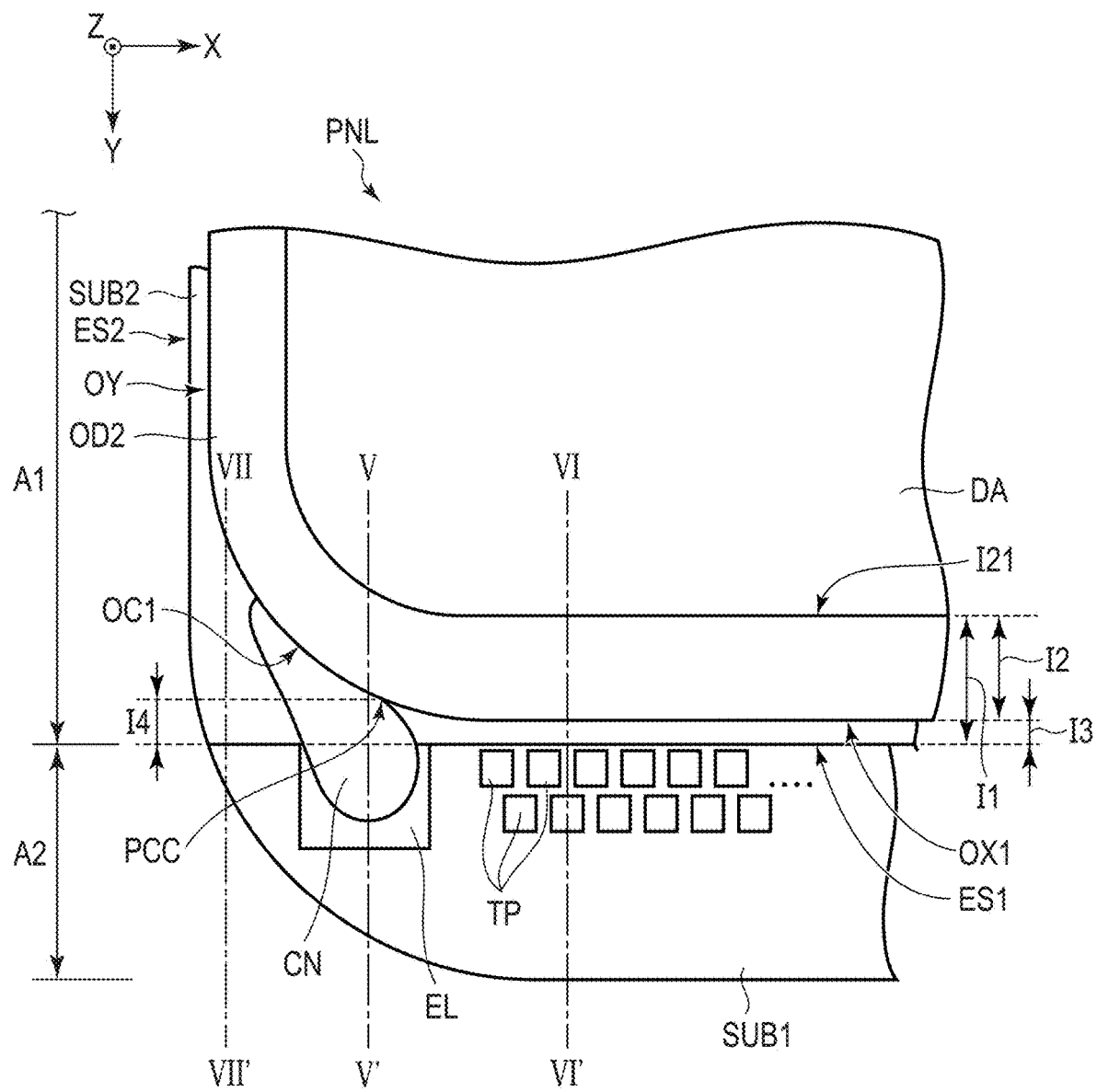
FIG. 4 is an enlarged plan view showing a vicinity of an end portion OC1 of an optical sheet.

FIG. 4 is an enlarged plan view showing a vicinity of the end portion OC1. The end portion OC1 is closer to the substrate end portion ES2 of the second substrate SUB2 than the end portion OX1, in the first direction X. In addition, the end portion OC1 is farther from the substrate end portion ES1 of the second substrate SUB2 than the end portion OX1, in the second direction Y.

A distance I1 between the inner peripheral part I21 (i.e., the end portion of the display region DA) and the substrate end portion ES1 is desired to be as small as possible in response to the demand to narrow the frame of the display device DSP. In contrast, a distance I2 between the inner peripheral part I21 and the end portion OX1 of the optical sheet OD2 needs to be a predetermined value since the distance is set based on, for example, a tolerance of printing of the light-shielding layer 21, a tolerance of bonding of a cover member to be described later, a thickness of an adhesive for bonding, and the like. As a result, a distance (second distance) 13 between the end portion OX1 and the substrate end portion ES1 becomes shorter to narrow the frame. For example, the distance 13 is shorter than the distance 12. Incidentally, each of the distances Il, 12, and 13 is a distance in the second direction Y.

The connecting member CN is overlaid on the electrode EL in the second region A2 and is provided along the end portion OC1 in the first region A1. As described above, the region where the optical sheet 002 is provided is substantially coincident with the region where the conductive member CL is provided. For this reason, the range in which the connecting member CN is in contact with the end portion OC1 corresponds to the range in which the connecting member CN is in contact with the conductive member CL.

In the present embodiment, the connecting member CN is partially in contact with the end portion OC1 but is not in contact with the end portion OX1 or OY. That is, the connecting member CN is in contact with the conductive member CL at the end portion OC1. In other words, the connecting member CN is in contact with the conductive member CL at a position farther from the substrate end portion ES1 than the end portion OX1. Therefore, in the present embodiment, a distance (first distance) 14 in the second direction Y between the substrate end portion ES1 and a position PCC where the connecting member CN is in contact with the conductive member CL is longer than the distance 13. The position PCC corresponds to the position closest to the substrate end portion ES1, of the end portion OC1 which is in contact with the connecting member CN.

In the example illustrated, the first substrate SUB1 comprises a plurality of inspection pads TP in addition to the electrode EL, in the second region A2. The inspection pads TP are located on an inner side than the electrode EL, in the first direction X.

Figure 5:
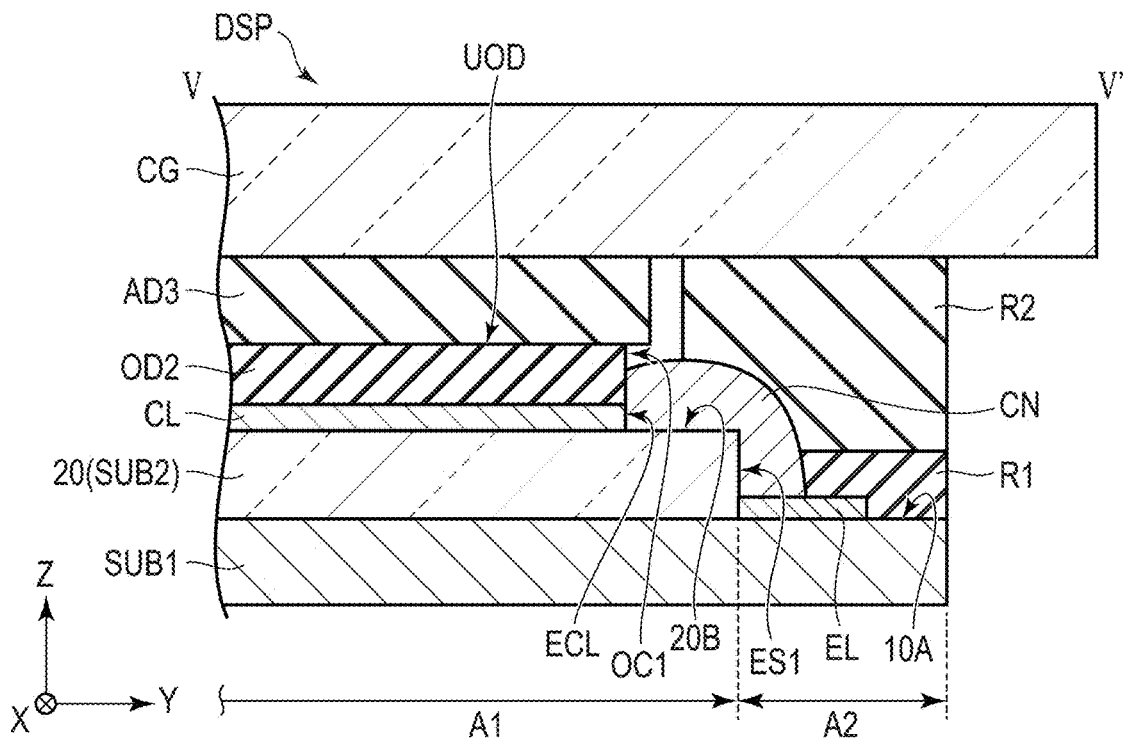
FIG. 5 is a cross-sectional view taken along line V-V' shown in FIG. 4.

FIG. 5 is a cross-sectional view taken along line V-V' shown in FIG. 4. The display device DSP comprises a cover member CG covering the display panel PNL, an adhesive layer AD3, a first resin R1, and a second resin R2 in addition to the display panel PNL and the connecting member CN. The cover member CG is formed of a transparent material such as glass or resin and is bonded to the optical sheet OD2 by the adhesive layer AD3.

The connecting member CN is provided on the electrode EL, on the first substrate SUB1. The connecting member CN is in contact with the substrate end portion ES1, an outer surface 20B, an end portion ECL of the conductive member CL, and an end portion OC1 of the optical sheet OD2, on the second substrate SUB2. In the example illustrated, the end portion OC1 and the end portion ECL are overlaid. That is, the connecting member CN is in contact with the conductive member CL at a position overlaid on the end portion OC1. Incidentally, the connecting member CN is not in contact with the adhesive layer AD3 or an upper surface UOD of the optical sheet OD2.

The first resin R1 and the second resin R2 are provided between the first substrate SUB1 and the cover member CG, in the second region A2. In the example illustrated, the first resin R1 covers the electrode EL and is in contact with the connecting member CN and an inner surface 10A of the first substrate SUB1. The inner surface 10A is a surface of the first substrate SUB1, which faces the second substrate SUB2. The first resin R1 is, for example, a moisture-resistant resin, which suppresses corrosion of a metal member such as the electrode EL. The second resin R2 is provided on the first resin R1 and is in contact with the connecting member CN and the cover member CG. In the example illustrated, the second resin R2 is separated from the optical sheet OD2 and the adhesive layer AD3. However, the second resin R2 may be in contact with both of the optical sheet OD2 and the adhesive layer AD3. The second resin R2 is, for example, a silicon resin and functions as a damper.

Figure 6:
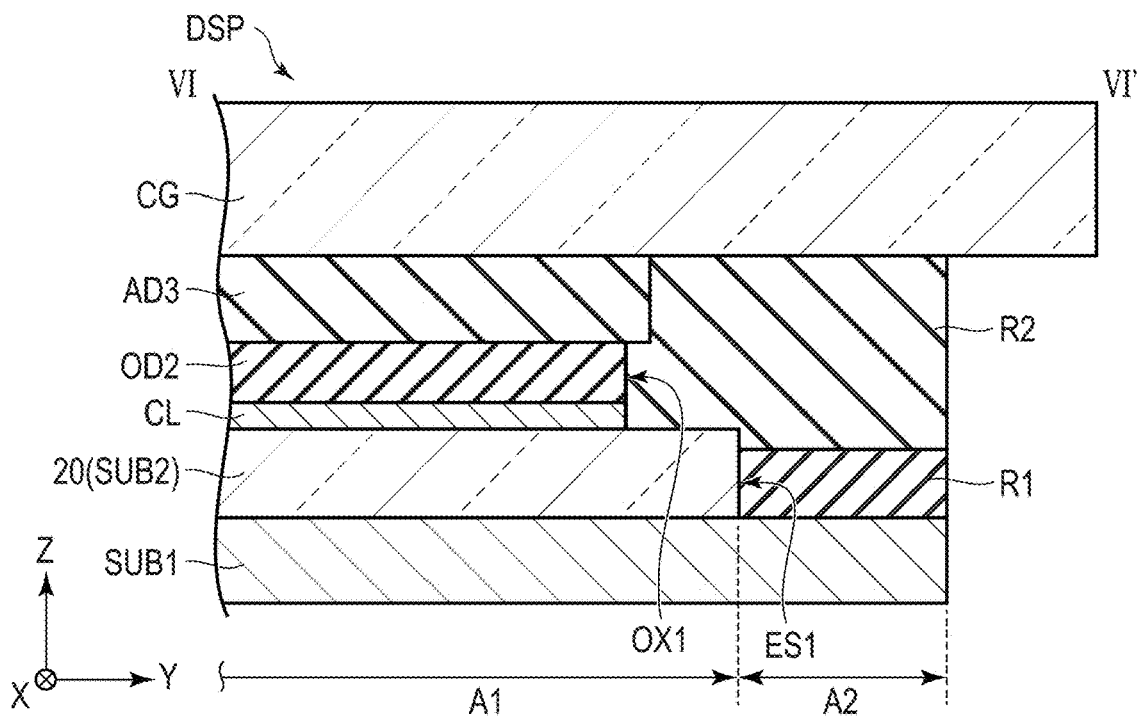
FIG. 6 is a cross-sectional view taken along line VI-VI' shown in FIG. 4.

FIG. 6 is a cross-sectional view taken along line VI-VI' shown in FIG. 4. In the example illustrated, space between the first substrate SUB1 and the cover member CG is filled with the first resin R1 and the second resin R2. That is, the first resin R1 is provided on the first substrate SUB1 and is in contact with the substrate end portion ES1. The second resin R2 is in contact with the first resin R1 and the cover member CG and is also in contact with the insulating substrate 20, the conductive member CL, the optical sheet OD2, and the adhesive layer AD3.

Figure 7:
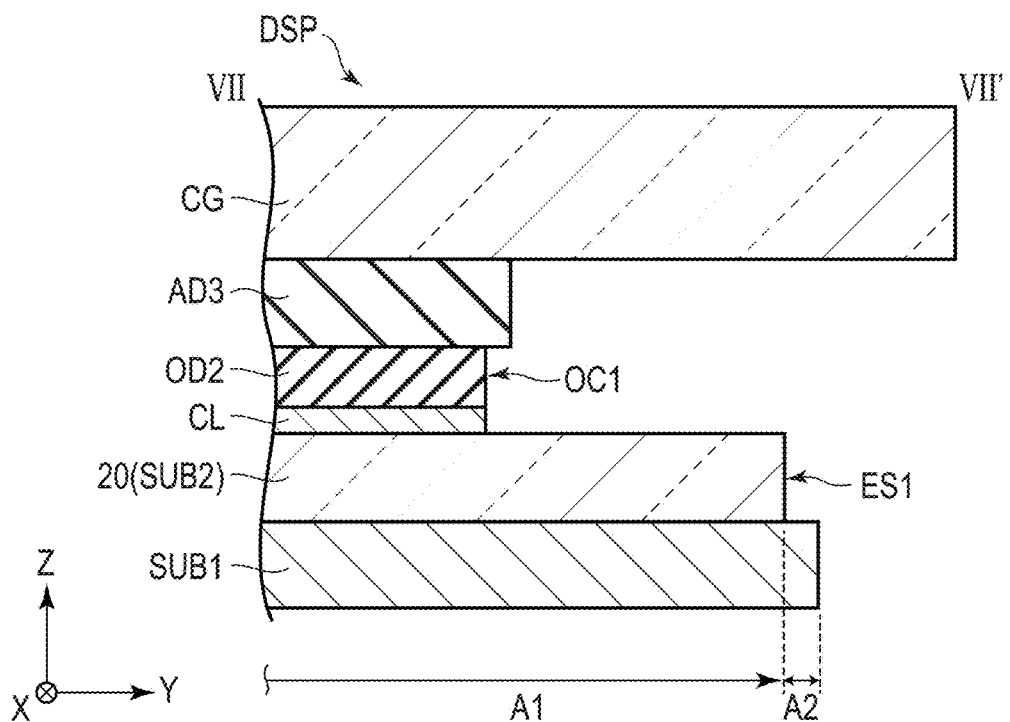
FIG. 7 is a cross-sectional view taken along line VII-VII' shown in FIG. 4.

FIG. 7 is a cross-sectional view taken along line VII-VII' shown in FIG. 4. In the cross-section shown in FIG. 7, a width of the second region A2 in the second direction Y is smaller than the width of the second region A2 in the second direction Y shown in FIG. 5 and FIG. 6. In other words, area where the cover member CG and the first substrate SUB1 face is small. For this reason, none of the first resin R1 and the second resin R2 is provided in the cross-section shown in FIG. 7.

Figure 8:
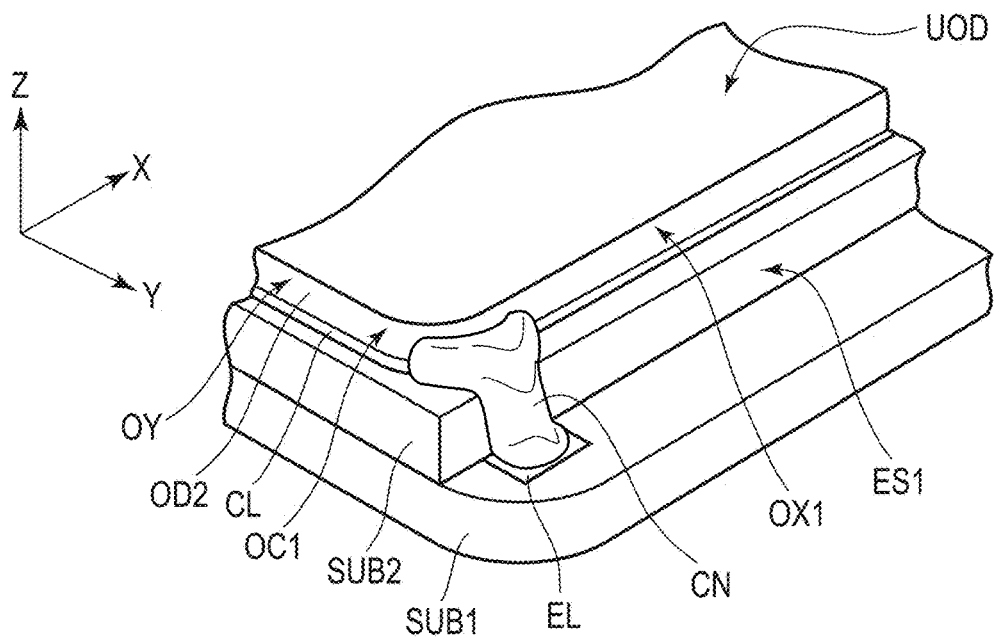
FIG. 8 is an enlarged perspective view showing a vicinity of the end portion OC1 of the optical sheet.

FIG. 8 is an enlarged perspective view showing the vicinity of the end portion OC1. The connecting member CN is provided on a substantially entire body of the end portion OC1 and is in contact with the conductive member CL. In contrast, the connecting member CN is not in contact with the upper surface UOD of the optical sheet OD2 in any one of the provided regions. In the example illustrated, the connecting member CN is not in contact with the end portion OY or OX1. However, the connecting member CN may be in contact with the end portions OY and OX1.

Figure 9:
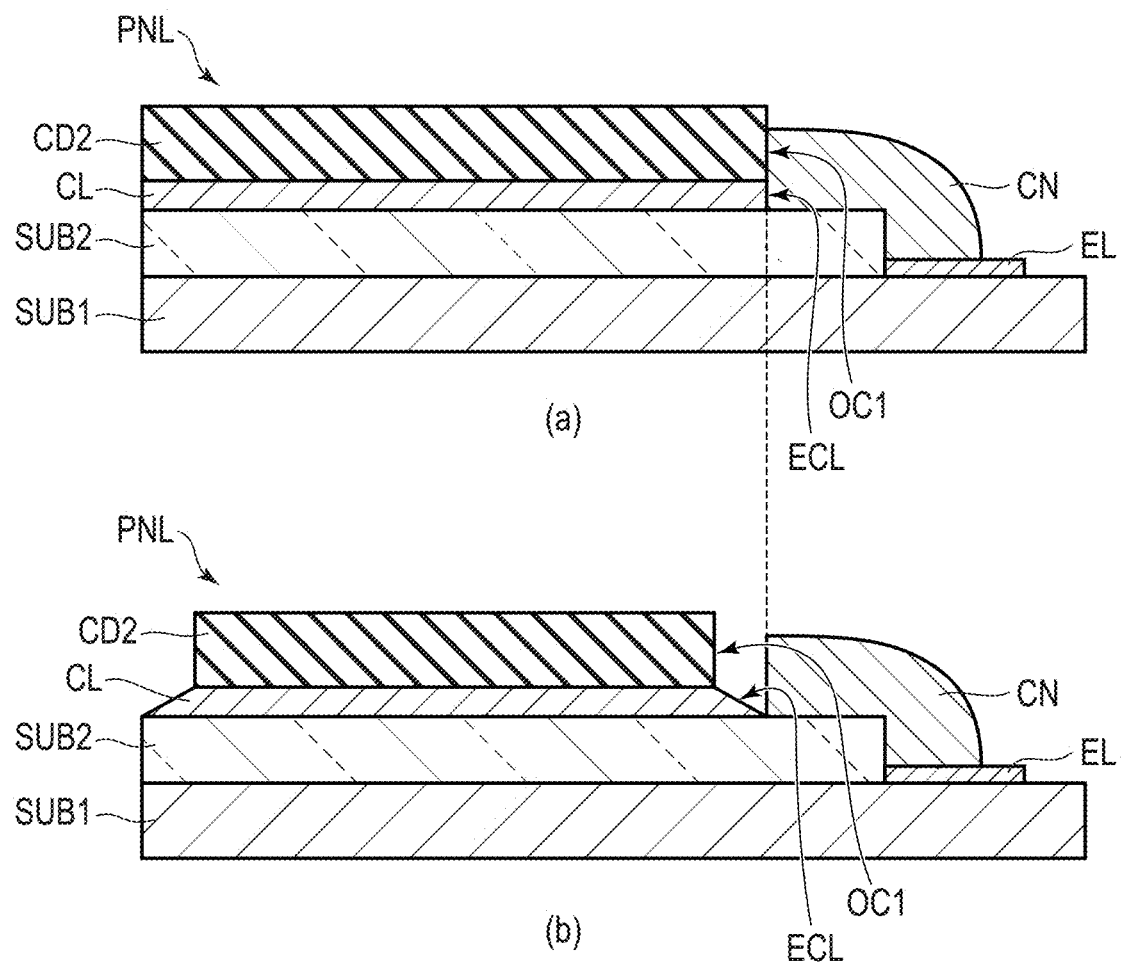
FIG. 9 is a view schematically showing circumstances of the optical sheet before and after thermal contraction.

FIG. 9 is a view schematically showing circumstances of the optical sheet OD2 before and after thermal contraction. FIG. 9(a) shows a state in which the optical sheet OD2 is to be thermally contracted. FIG. 9(b) shows a state in which the optical sheet OD2 has been thermally contracted in the second direction Y.

As shown in FIG. 9(a), the connecting member CN is in partial contact with the end portion OC1 of the optical sheet OD2 and is in contact with an entire body of the end portion ECL of the conductive member CL before the optical sheet OD2 is thermally contracted. In contrast, as shown in FIG. 9(b), the position of the end portion OC1 is often retreated when the optical sheet OD2 is thermally contracted. Since the conductive member CL which is in contact with the optical sheet OD2 is also retreated in accordance with the contraction of the optical sheet OD2, the area of contact between the conductive member CL and the connecting member CN may be reduced.

According to the first embodiment, the optical sheet OD2 includes the end portion OX1 extending along the substrate end portion ES1 and the end portion OC1 farther from the substrate end portion ES1 than the end portion OX1. The conductive member CL is provided in a region overlaid on the optical sheet OD2 to bond the optical sheet OD2 and the second substrate SUB2. The connecting member CN is in contact with the electrode EL and is in contact with the conductive member CL at the position overlaid on the end portion OC1, and thereby makes electric connection between the electrode EL and the conductive member CL. That is, the connecting member CN extends to the side more separated from the substrate end portion ES1 than from the end portion OX1, in planar view. Thus, even when a sufficient space is not present by, for example, arranging the inspection pads TP in the second region A2 and the distance 13 between the optical sheet OD2 and the substrate end portion ES1 is short in the first region A1, the area of contact between the connecting member CN and the conductive member CL can be secured at the position overlaid on the end portion OC1.

Furthermore, according to the present embodiment, the end portion OC1 is formed in a curved shape in planar view, along the corner portion C1 of the first substrate SUB1. That is, the length of the end portion OC1 can be made larger as compared with a case where the end portion OC1 connects the end portion OX1 and the end portion OY, for example, linearly. Therefore, even when, for example, the area of contact between the connecting member CN and the conductive member CL is reduced in accordance with the thermal contraction of the optical sheet OD2 as shown in FIG. 9(b), the area of contact between the connecting member CN and the conductive member CL at the position overlaid on the end portion OC1 can be secured by making the length of the end portion OC1 longer.

In addition, the electrode EL is desirably formed at a position near the end portion OC1 of the optical sheet OD2 upon securing the area of contact between the connecting member CN and the conductive member CL at the end portion OC1. It is considered that the space to arrange the inspection pads TP can also be provided in the second region A2 formed as a narrow frame by forming the electrode EL at the position near the end portion OC1.

As described above, according to the first embodiment, narrowing the frame of the display device DSP can be implemented and the connection failure caused in accordance with the reduction in the area of contact between the conductive member CL and the connecting member CN can be suppressed. Reduction in the reliability can be therefore suppressed.

Figure 10:
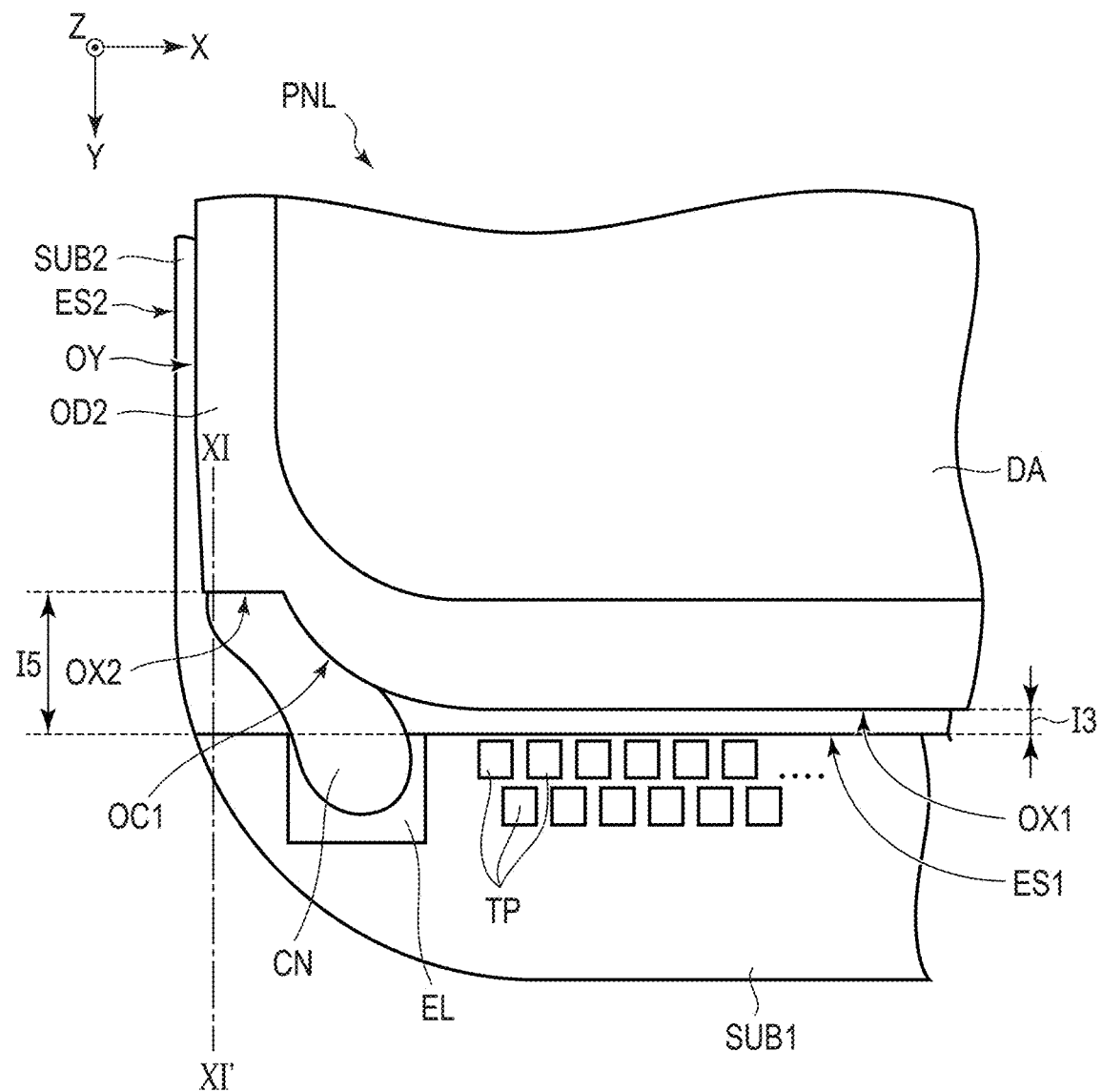
FIG. 10 is a plan view showing another example of the optical sheet.

FIG. 10 is a plan view showing another example of the optical sheet OD2. The example shown in FIG. 10 is different from the example shown in FIG. 4 with respect to a feature that the optical sheet OD2 further comprises an end portion (third end portion) OX2. For example, the end portion OX2 extends parallel to the end portion OX1. The end portion OX2 is closer to the substrate end portion ES2 than the end portion OC1 in the first direction X. In addition, the end portion OX2 is farther from the substrate end portion ES1 than the end portion OC1 in the second direction Y. That is, a distance (third distance) 15 between the end portion OX2 and the substrate end portion ES1 is longer than the distance 13. The end portion OC1 makes connection between the end portion OX1 and the end portion OX2.

The connecting member CN extends in a region between the end portion OX2 and the end portion OX1. More specifically, the connecting member CN extends along the substrate end portion ES1 and is located between the end portion OX2 and the end portion OX1. In the example illustrated, the connecting member CN is in contact with the end portion OC1 and is also in contact with the end portion OX2.

FIG. 11 is a cross-sectional view taken along line XI-XI' shown in FIG. 10. The region where the second substrate SUB2 is covered with the optical sheet OD2 in the cross-section shown in FIG. 11 is larger as compared with the cross-section shown in FIG. 7. In other words, a size of a cavity between the second substrate SUB2 and the cover member CG, as represented by a broken line in the figure, is smaller than a size of a cavity in the cross-section shown in FIG. 7.

The connecting member CN is in contact with the end portion OX2 of the optical sheet OD2 and the end portion ECL of the conductive member CL. In the example illustrated, the end portion OC2 and the end portion ECL are overlaid. That is, the connecting member CN is in contact with the connecting member CN at a position overlaid on the end portion OX2.

In the example shown in FIG. 10, too, the same advantages as those of the example shown in FIG. 4 can be obtained. Furthermore, according to the example shown in FIG. 10, since the cavity between the cover member CG and the second substrate SUB2 is smaller, strength of the display device DSP against, for example, the impulse receiving from the outside can be increased.

Figure 12:
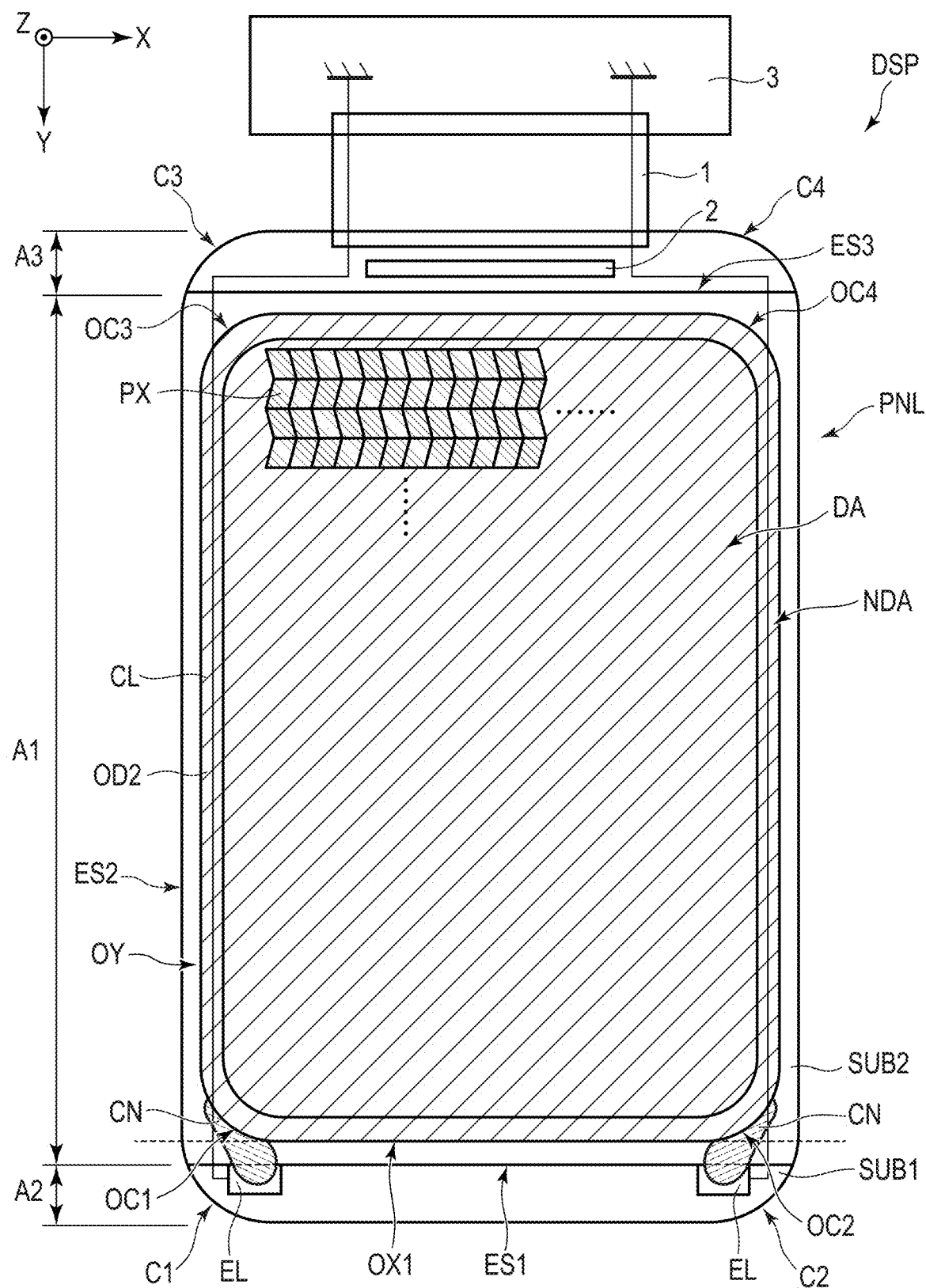
FIG. 12 is a plan view showing another example of the display device according to the first embodiment.

FIG. 12 is a plan view showing another example of the display device DSP. The example shown in FIG. 12 is different from the example shown in FIG. 1 with respect to a feature that the flexible printed circuit 1 is provided on a side opposite to the electrodes EL.

The second substrate SUB2 is located substantially in the center of the first substrate SUB1 in the second direction Y. In other words, the first substrate SUB1 comprises a third region A3 where the flexible printed circuit 1 is mounted in addition to the first region A1 and the second region A2. The third region A3 is arranged with the first region A1 and the second region A2 in the second direction Y. The third region A3 is adjacent to the first region A1 on a side opposite to the second region A2. The first region A1 is located between the second region A2 and the third region A3 in the second direction Y. The second substrate SUB2 is not overlaid on the first substrate SUB1 in the third region A3. The second substrate SUB2 includes a substrate end portion ES3 located on the boundary between the third region A3 and the first region A1. For example, the substrate end portion ES3 extends straight in the first direction X and has the same length as the substrate end portion ES1.

In the example illustrated, the IC chip 2 is mounted in the third region A3 and is located between the substrate end portion ES3 and the flexible printed circuit 1. Incidentally, the IC chip 2 may be mounted on the flexible printed circuit 1.

The electrodes EL are grounded via the flexible printed circuit 1, similarly to the first embodiment. A line connected to the electrode EL in the vicinity of the corner portion C1 extends along, for example, the substrate end portion ES2 in the non-display region NOA and is electrically connected to the flexible printed circuit 1. A line connected to the electrode EL in the vicinity of the corner portion C2 extends along, for example, the substrate end portion ES4 in the non-display region NOA and is electrically connected to the flexible printed circuit 1. The substrate end portion ES4 is an end portion of the second substrate SUB2, located on a side opposite to the substrate end portion ES2 and extending in the second direction Y.

In the example shown in FIG. 12, too, the same advantages as those of the example shown in FIG. 1 can be obtained. Furthermore, according to the example shown in FIG. 12, design property can be improved since the width of the non-display region NDA on the substrate end portion ES1 side and the side of the non-display region NDA on the substrate end portion ES3 are made more uniform.

As described above, according to the first embodiment, the display device DSP capable of suppressing degradation of the reliability can be provided.

Second Embodiment

Figure 13:
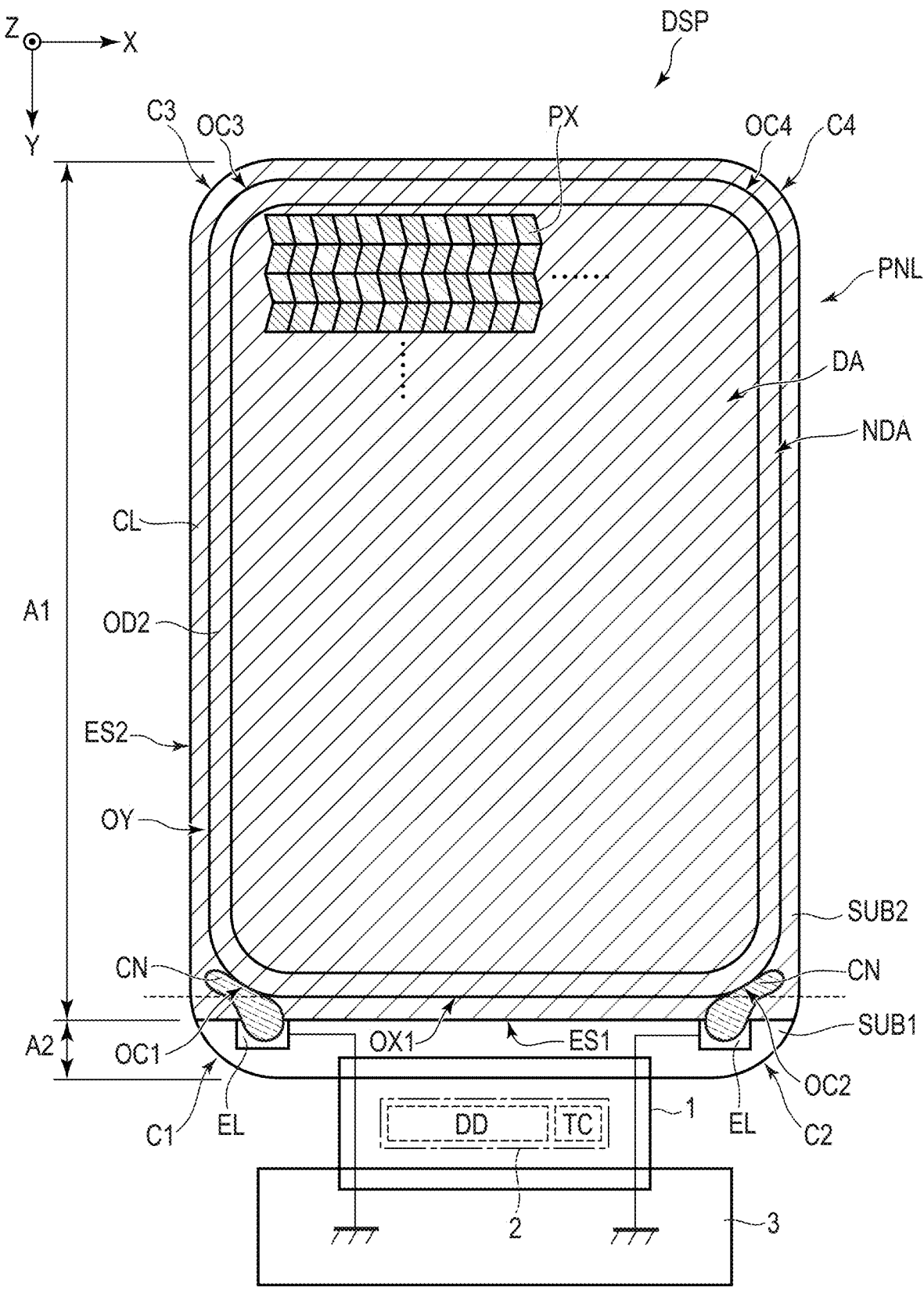
FIG. 13 is a plan view showing an example of an appearance of a display device according to a second embodiment.

FIG. 13 is a plan view showing an example of an appearance of a display device DSP according to a second embodiment. The second embodiment is different from the first embodiment with respect to a feature that a conductive member CL is provided in a region wider than the region overlaid on an optical sheet OD2. In the example illustrated, the conductive member CL is provided on an entire surface of the second substrate SUB2. In other words, the region where the conductive member CL is provided is coincident with the first region A1. The conductive member CL is formed of, for example, a transparent conductive material such as indium tin oxide (ITO) or indium zinc oxide (IZO). The connecting member CN is overlaid on the electrode EL, extends to a side farther from a substrate end portion ES1 than an end portion OX1, and is overlaid on the conductive member CL.

Figure 14:
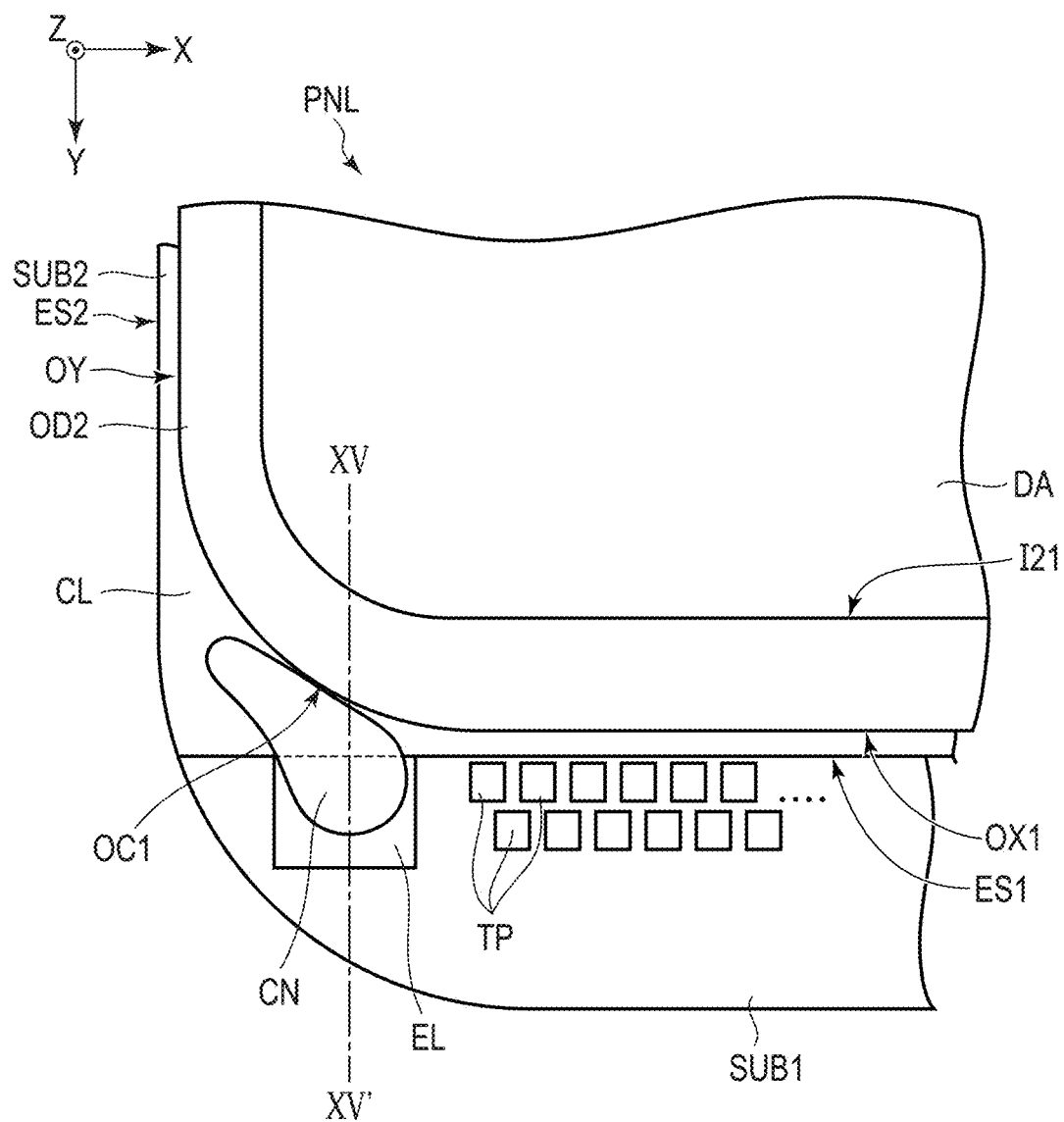
FIG. 14 is an enlarged plan view showing a vicinity of an end portion OC1 of an optical sheet.

FIG. 14 is an enlarged plan view showing a vicinity of the end portion OC1. In the example illustrated, the connecting member CN is hardly in contact with the end portion OC1. The connecting member CN is in contact with the conductive member CL in a region between the end portion OC1 and the substrate end portion ES1. Incidentally, the connecting member CN may be in contact with the end portion OC1.

Figure 15:
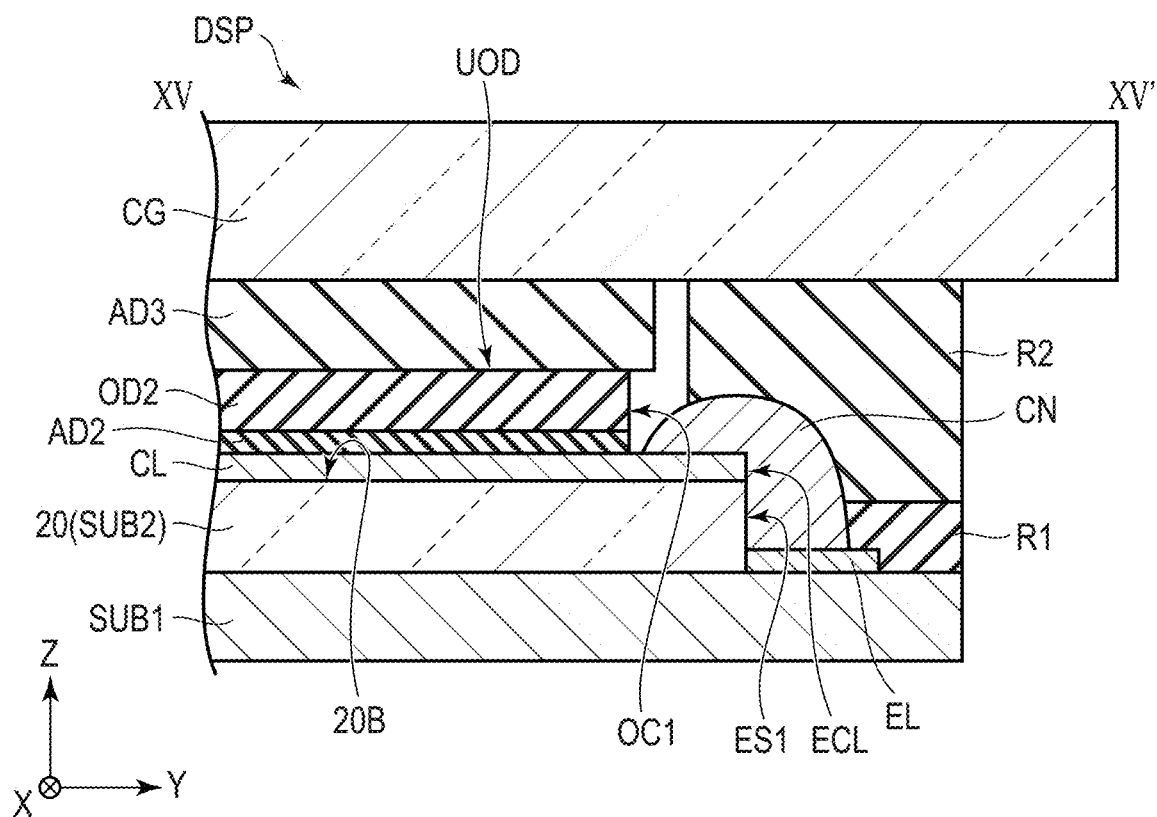
FIG. 15 is a cross-sectional view taken along line XV-XV' shown in FIG. 14.

FIG. 15 is a cross-sectional view taken along line XV-XV' shown in FIG. 14. The conductive member CL is located between the second substrate SUB2 and the optical sheet OD2. More specifically, the conductive member CL is provided on an entire body of an outer surface 20B of an insulating substrate 20. In other words, the conductive member CL extends to an outer side than the optical sheet OD2. In the example illustrated, an end portion ECL of the conductive member CL and the substrate end portion ES1 of the second substrate SUB2 are overlaid.

The connecting member CN is continuously provided between the electrode EL and the conductive member CL. That is, the connecting member CN is in contact with the electrode EL and is also in contact with the conductive member CL extending to the outer side than the optical sheet OD2. The electrode EL and the conductive member CL are thereby electrically connected to each other. In the example illustrated, the connecting member CN is in contact with the substrate end portion ES1 and the end portion ECL of the conductive member CL.

The optical sheet OD2 is bonded to the conductive member CL by an adhesive layer AD2. The adhesive layer AD2 is provided in a region overlaid on the optical sheet OD2. In the present embodiment, the adhesive layer AD2 is conductive. In the example illustrated, the connecting member CN is separated from the optical sheet OD2 and the adhesive layer AD2. Incidentally, the connecting member CN needs only to be in no contact with an upper surface UOD of the optical sheet OD2 but may be in contact with at least one of the adhesive layer AD2 and the end portion OC1 of the optical sheet OD2.

According to the second embodiment, the conductive member CL is provided on an entire body of an outer surface 20B of the insulating substrate 20 and extends to the outer side than the optical sheet OD2. The connecting member CN is in contact with the electrode EL and is in contact with the conductive member CL extending to the outer side than the optical sheet OD2, and thereby makes electric connection between the electrode EL and the conductive member CL. That is, the connecting member CN extends to the side more separated from the substrate end portion ES1 than from the end portion OX1, in planar view. Thus, even when, for example, a sufficient space is not present in the second region A2 and the distance 13 between the optical sheet OD2 and the substrate end portion ES1 is short in the first region A1, the area of contact between the connecting member CN and the conductive member CL can be secured by extending the connecting member CN to the end portion OC1 side.

As described above, according to the second embodiment, narrowing the frame of the display device DSP can be implemented and the connection failure caused in accordance with the reduction in the area of contact between the conductive member CL and the connecting member CN can be suppressed. Reduction in the reliability can be therefore suppressed.

Figure 16:
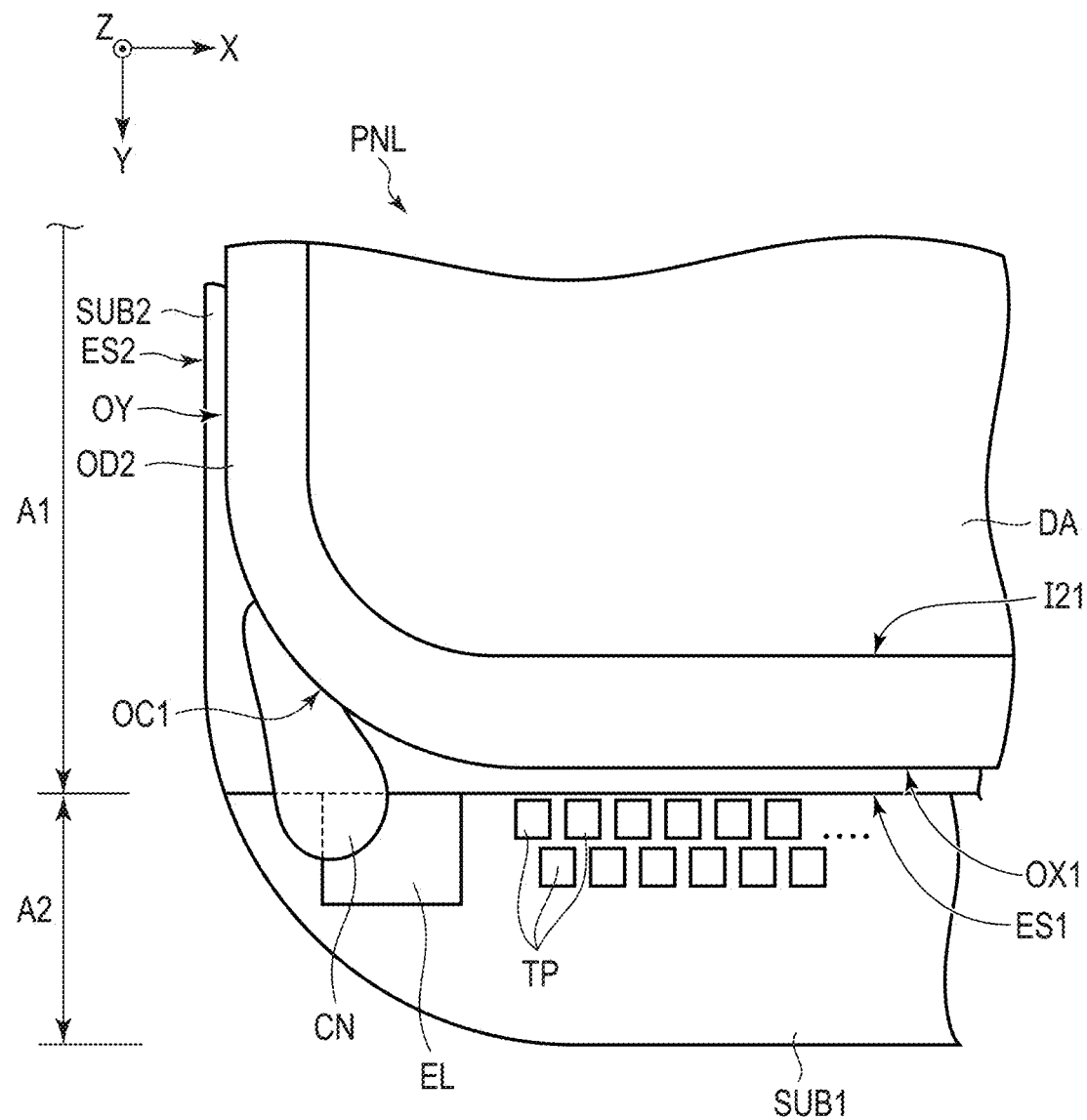
FIG. 16 is a view showing another modified example, illustrating a vicinity of an end portion OC1 of an optical sheet.

FIG. 16 is a view showing another modified example, illustrating the vicinity of the end portion OC1 of the optical sheet. The connecting member CN is formed to be contained in the electrode EL in the examples shown in FIG. 4, FIG. 10, and FIG. 14. In the example shown in FIG. 16, however, the connecting member CN is designed not to be partially overlaid on the electrode EL. That is, the difference between FIG. 16 and FIG. 4 is that the connecting member CN is formed to be displaced to the direction of the substrate end portion ES2 of the second substrate SUB2 or the end portion OY of the optical sheet OD2. Therefore, the connecting member CN is formed to have a portion which is in contact with the electrode EL and a portion which is not in contact with the electrode EL in the second region A2. The connecting member CN is a conductive paste. In FIG. 16, the connecting member CN is arranged to a side close to the substrate end portion ES2 or the end portion OY, in consideration of the possibility of contacting the inspection pads TP in accordance with narrowing the frame. Thus, a risk that the connecting member CN may leak to the inspection pads TP and a short circuit may occur is reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a first substrate comprising an electrode;
a second substrate overlaid on the first substrate;
an optical sheet overlaid on the second substrate;
a conductive member located between the second substrate and the optical sheet;
a cover member covering the first substrate;
an adhesive layer bonding the cover member and the optical sheet;
a resin between the electrode and the cover member; and
a connecting member making electric connection between the conductive member and the electrode,
the first substrate including a first region overlaid by the second substrate, and a second region extending more than the second substrate and including the electrode,
the second substrate including a substrate end portion which is located on a boundary between the first region and the second region and which extends along a first direction,
the optical sheet including a first end portion parallel to the substrate end portion,
the connecting member being in contact with the electrode and the conductive member,
a first distance between the substrate end portion and a position where the connecting member is in contact with the conductive member being longer than a second distance between the first end portion and the substrate end portion, in a second direction intersecting the first direction,
the cover member overlaps the second region of the first substrate, and
the resin is in contact with each of the electrode, the connecting member and the cover member, in the second region.

2. The display device of claim 1, wherein
the optical sheet includes a second end portion connected to the first end portion,
the first end portion is formed in a linear shape,
the second end portion is formed in a curved shape,
the connecting member is in contact with the conductive member at the second end portion,
the resin includes a first resin and a second resin,
the first resin is in contact with the electrode and the connecting member, and is not contact with the cover member,
the second resin is in contact with the connecting member and the cover member, and is not contact with the electrode,
the first resin is a moisture-resistant resin, and
the second resin is a silicon resin.

3. The display device of claim 2, wherein
the conductive member is a conductive adhesive bonding the second substrate and the optical sheet and is provided in a region overlaid on the optical sheet, and
the connecting member is in contact with the conductive member at a position overlaid on the second end portion in planar view.

4. The display device of claim 2, wherein
the optical sheet includes a third end portion parallel to the first end portion, a third distance between the third end portion and the substrate end portion is longer than the second distance in the second direction, and the connecting member is located between the third end portion and the first end portion along the substrate end portion.

5. The display device of claim 4, wherein
the connecting member is in contact with the conductive member at a position overlaid on the third end portion in planar view.

6. The display device of claim 1,
wherein
the connecting member is not in contact with the adhesive layer and an upper surface of the optical sheet.

7. The display device of claim 2, wherein
the electrode is formed near the second end portion.

8. The display device of claim 1, wherein
the first substrate further includes a third region extending more than the second substrate, the first region is located between the second region and the third region in the second direction, and the electrode is connected to a flexible printed circuit mounted in the third region.

9. The display device of claim 1, wherein
the optical sheet includes a second end portion connected to the first end portion, the first end portion is formed in a linear shape, the second end portion is formed in a curved shape, the conductive member is provided on an entire surface of the second substrate, and the connecting member is in contact with the conductive member at a position between the second end portion and the substrate end portion.

10. The display device of claim 1, wherein
the connecting member includes a portion in contact with the electrode and a portion which is not in contact with the electrode, in the second region.

* * * * *